United States Patent [19]

Kennedy-Skipton et al.

[11] 4,251,430

[45] Feb. 17, 1981

[54] FIRE RESISTANT ADDITIVE FOR HARDENABLE RESIN COMPOSITIONS

[75] Inventors: Henry K. Kennedy-Skipton, West Kilbride; Thomas Robertson, Mauchline, both of Scotland

[73] Assignee: Imperial Chemical Industries Limited, London, England

[21] Appl. No.: 968,432

[22] Filed: Dec. 8, 1978

[30] Foreign Application Priority Data

Dec. 22, 1977 [GB] United Kingdom ............... 53445/77

[51] Int. Cl.³ .......................... C01F 7/02; C08K 3/22
[52] U.S. Cl. .............. 260/40 R; 260/45.7 R; 423/625; 525/15
[58] Field of Search ............. 260/865, 45.7 R, 40 R; 106/288 B; 423/625; 525/15

[56] References Cited

U.S. PATENT DOCUMENTS

| | | | |
|---|---|---|---|
| 2,449,299 | 9/1948 | Hurdis | 260/865 |
| 3,265,466 | 8/1966 | Mollard | 423/625 |
| 3,336,416 | 8/1967 | Eimers et al. | 260/865 |
| 3,714,113 | 1/1973 | Kingston | 260/40 R |
| 3,780,156 | 12/1973 | Cameron | 264/300 |
| 3,909,484 | 9/1975 | Beavon | 260/45.7 P |
| 3,983,184 | 9/1976 | Kikuzawa et al. | 260/865 |
| 4,041,008 | 8/1977 | Makhlouf et al. | 260/40 R |
| 4,076,580 | 2/1978 | Panusch et al. | 428/921 |
| 4,085,088 | 4/1978 | Miyata et al. | 106/288 B |
| 4,105,465 | 8/1978 | Berger | 106/288 B |
| 4,159,977 | 7/1979 | Hsieh | 525/15 |

*Primary Examiner*—Hosea E. Taylor
*Assistant Examiner*—R. A. White
*Attorney, Agent, or Firm*—Cushman, Darby & Cushman

[57] ABSTRACT

A hardenable resin composition (or a component thereof) containing as a fire retardant ingredient particulate aluminium hydroxide wherein 10 to 30% by weight of the particles have a diameter less than 1 micron, 45 to 75% by weight of the particles have a diameter in the range from 38 to 150 microns and less than 20% by weight of the particles have a diameter in the range from 1 to 38 microns. The invention includes a preferred blend of aluminium hydroxide.

15 Claims, No Drawings

FIRE RESISTANT ADDITIVE FOR HARDENABLE RESIN COMPOSITIONS

This invention relates to an additive which is effective to improve the fire resistance of hardenable resins and components thereof. More particularly the invention relates to blends of particulate aluminium hydroxide and to hardenable resin compositions and components containing particulate aluminium hydroxide.

Hardened synthetic resins are widely used for strengthening rock and engineering structures and for securing reinforcing and fixing elements such as anchor bolts in drillholes in rock and masonry. The resin composition generally comprises two components, one component containing hardenable liquid resin and the other component containing a hardener (or catalyst) for the resin. The components are usually in frangible containers which may, for example, be separate compartments of a synthetics plastics film container.

Methods for encapsulating the resin and hardener components are described in United Kingdom Patent Specifications Nos. 998,240, 1,127,913, 1,160,123 and 1,297,554. Cartridge packs containing both components are most convenient and have found widespread use for securing reinforcing members, for example, wooden dowels or metal bolts, into fractured or weak strata to improve the safety and workability of the strata. These packs are loaded into position, for example, into drillholes and broken, and the components are then mixed and the resin hardens.

Epoxy, polyurethane and polyester resins have been encapsulated for the purpose of strata reinforcement, but because of technical, safety and cost requirements only amine accelerated unsaturated polyester resins have been adopted for general use. These polyester resins are technically better and they are generally less expensive than most other organic resins. However, from the safety aspect, in particular as a fire hazard, the polyester resins are less attractive. In the uncured state, the resin composition usually contains about 10% by weight of styrene or vinyl toluene as crosslinking monomer, which makes it highly inflammable. In addition the hardener is usually an aryl peroxide which, besides being itself a highly inflammable substance, provides oxygen during decomposition to assist the burning of the adjacent resin. Consequently, although polyester resins are widely used for strata reinforcement in mining operations, their potential fire hazard remains a serious problem and has inhibited their use. Thus non-flammable grouts based on cementitious or plaster compositions have been adopted in certain cases where high strength, rapid setting and convenience are not so critical, for example, in coal mining, for temporary reinforcement of an advancing coal face.

The flammability of the polyester resin cartridges can be reduced slightly by dilution of the resin and hardener with non-flammable fillers, for example, calcium carbonate, quartz, china clay and with liquid chlorinated hydrocarbon waxes. Nevertheless, the cartridges can be still ignited by a very small flame source and will normally continue to burn until all the flammable ingredients are consumed. Further improvement in fire resistance may be achieved by the inclusion of inorganic or organic fire suppressants, for example, antimony trioxide preferably in conjunction with a chlorinated hydrocarbon wax containing 40 to 70% chlorine, or an organic or inorganic phosphate, for example, tris 2,3-dibromopropyl phosphate, trichloropropyl phosphate, tri-beta chloroethyl phosphate, ammonium phosphate, calcium phosphate, or inorganic compounds, for example, hydrated aluminium or iron, sulphates (alums), zinc borate or boric acid. However, none of these fire suppressants is satisfactory as the compound (or its pyrolysis products) is toxic, or it is insufficiently effective or too costly. Organic fire retardants also produce smoke and obnoxious odours on burning that are undesirable in the confined conditions of a mine.

It is an object of this invention to provide hardenable resin compositions and components thereof which have enhanced fire resistance. A further object is to provide an additive material for inclusion in resin compositions and components thereof to improve the fire resistance of the compositions and components.

Aluminium hydroxide is used as a smoke suppressant and fire retardant filler in some commercial resin compositions. Unlike the usual fire retardants which mostly act by generation of a heavy and fire extinguishing gas that is also frequently toxic and by generation of highly reactive decomposition products that act as free radical terminators in the burning process, the action of aluminium hydroxide is by harmless endothermic dehydration which, apart from producing a significant cooling effect, also promotes the formation of a thin crust on the burning surface and cuts off air supply to the resin underneath. Aluminium hydroxide is non-toxic and does not produce toxic or corrosive pyrolysis products. However, none of the grades is satisfactory as the coarser grades are not sufficiently effective and the finer and intermediate particle size grades cannot be incorporated in sufficient quantity without conferring undesirable flow properties to the resin components. Thus the finer grades impair the thixotropy of the resin component and commonly the viscosity of the resulting composition increases with increased shear rate, whereas a rapid decrease in viscosity with increasing shear rate is desirable.

In accordance with this invention the fire resistance of a hardenable resin composition or a hardener component of a two component resin composition is enhanced by mixing with the resin or hardener component particulate aluminium hydroxide wherein 10 to 30% by weight of the particles have a diameter less than 1 micron, 45 to 75% by weight of the particles have a diameter in the range from 38 to 150 microns; and less than 20% by weight of the particles have a diameter in the range from 1 to 38 microns.

The aluminium hydroxide is conveniently provided as a blend of a coarse grade and a fine grade of particulate aluminium hydroxide; said coarse grade having an average particle diameter of 50 to 100 microns and containing less than 10% by weight of particles having a diameter less than 5 microns and at least 90% by weight of particles having a diameter less than 150 microns, said fine grade having average particle diameter of 0.4 to 0.8 microns and containing at least 80% by weight of particles having a diameter of less than 1 micron; and the ratio of coarse grade to fine grade in the blend being in the range 1:1 to 10:1 and preferably being in the range 2:1 to 8:1. The invention includes the aforespecified blend of aluminium hydroxide and the improved resin compositions and resin components.

Whilst the aforespecified particulate aluminium hydroxide is effective in any hardenable resin composition, it is especially effective in unsaturated polyester resins, for example, those made by condensation of maleic or phthalic anhydride and propylene glycol or ethylene glycol, and preferably in admixture with an unsaturated monomer, for example, styrene or vinyl toluene. The resins may include promoters, for example, aromatic amines to accelerate the hardening and antioxidants, for example, quinol type antioxidants, without substantially impairing the effect of the fire retardant.

In addition to the aluminium hydroxide various other fillers, for example, calcium carbonate, quartz, china clay, bentonite, chalk or titanium dioxide may be included in the resin compositions. These fillers contribute very little to improving fire resistance and, if present in large amounts, will correspondingly reduce the quantity of aluminium hydroxide that can be incorporated into the resin.

The preferred hardener is benzoyl peroxide because of its cheapness, availability and storage stability. The hardener component preferably contains solid benzoyl peroxide dispersed in a paste with plasticiser, for example dibutyl phthalate and/or chlorinated hydrocarbon wax, the paste being extended with inorganic fillers comprising the aforespecified blend of aluminium hydroxide. Additional filler material, for example, calcium phosphate may also be included.

The amount of aluminium hydroxide in the resin composition or in the resin containing component or the hardener containing component of a two component resin composition is preferably in the range from 40 to 80% by weight.

The invention is further illustrated by the following Examples wherein all parts and percentages are given by weight. Examples 1 to 4 and 12 are in accordance with the invention and the remaining Examples are included for comparison with the Examples of the invention.

EXAMPLES

In these Examples, samples of resin containing component, hardener component, cartridge packs containing the separately encapsulated components of two-component resin compositions and the hardened resin were prepared and tested for fire resistance by standard flame tests.

The polyester resin used in the Examples comprised a condensate of phthalic anhydride and propylene glycol dissolved in styrene obtainable commercially under the trade name IMPOLEX D1080 (Registered Trade Mark) from Imperial Chemical Industries Limited, London.

In testing the uncured resin component and hardener component, a 1 cm. thick sample was placed on a thin metal plate and exposed to the flame from a butane gas burner directed downwards at a 45° angle to the sample with the burner head at 50 mm. distance from the sample. The flame height was 12.5 cm. and the flame temperature was 950° C. The flame was directed on the sample for 20 seconds and then removed and the time taken for the extinction of a flame on the sample was recorded. The cartridge packs contained uncured resin in an outer polythene tubular container 40 mm. diameter×33 cm. long×0.025 mm. wall thickness and hardener composition in an inner polythene tubular container, the tubes being co-terminus and joined together by end closure clips as described in United Kingdom Patent Specification No. 1,295,534. The cartridge was tested by suspending it horizontally in a draught free environment and exposing a central portion to a flame directed at right angles to the longitudinal axis of the cartridge and upwardly at an angle of 45°. The burner was 50 mm. from the cartridge, the flame height was 15 cm. and the flame temperature was 1000° C. The flame was applied for 30 seconds, and then removed and the time taken for extinction of any flame on the cartridge and on the debris underneath respectively recorded.

The cured resin was tested by exposing a test piece 15 cm.×1.27 cm.×3 mm. (for 30 seconds) to the same flame as used in testing the cartridge packs. If any flame on the test piece was extinguished within 10 seconds the flame was reapplied for a further 30 seconds. The flame extinction time after the first and second flame applications were recorded.

EXAMPLES 1–11

The compositions of the resin containing components of these Examples are given in Table 2, together with the results of five tests on the components and cartridge packs. The filler in Examples 1 to 7 inclusive was a blend of 2 grades of particulate aluminium hydroxide and the fillers in Examples 8 to 10 were individual grades of the blends used in Examples 1 to 7. In Example 11 the filler was ground calcium carbonate.

The particle size distribution of the grades of aluminium hydroxide used in the Examples are given in Table 1. The average particle size of the aluminium hydroxide was 0.6 microns for Grade A, 10 microns for Grade B, 65 microns from Grade C and 90 microns for Grade D. The average particle size of the calcium carbonate was 150 microns. The resin cartridges for fire tests each contained about 12 parts of hardener paste per 100 parts of resin component, the hardener paste composition containing 25% of benzoyl peroxide, 25% of a liquid chlorinated hydrocarbon wax having a chlorine content of 40%, 25% of china clay and 25% of calcium carbonate.

TABLE 1

| Grade Particle size (μ) | A | B | C | D |
|---|---|---|---|---|
| Average | 0.6 | 10 | 65 | 90 |
| Maximum | 3.0 | 40 | 250 | 400 |
| Minimum | 0.05 | 0.5 | 0.5 | 0.5 |
| <1μ(%) | >80 | <15 | 0 | 0 |
| <38μ(%) | 100 | >90 | <20 | <15 |
| <150μ(%) | 100 | 100 | >90 | <70 |
| <250μ(%) | 100 | 100 | 100 | >80 |

The test results given in Table 2 show that Examples 1 to 5 inclusive had desirable thixotropic properties (as shown by reduced viscosity at high shear) corresponding to those of Example 11 (with calcium carbonate filler) and in this respect was superior to any of Examples 7 to 10. Examples 1 to 5 inclusive also had markedly better fire resistance than any of the other Examples.

A cartridge of Example 2 containing a blend of two grades of aluminium hydroxide was used to anchor a 25 mm. ribbed steel bolt in a 35 mm. diameter by 300 mm. length hole. The hole was cast in a reinforced concrete block of compressive strength 28 KN/m² and the hole walls were roughened to imitate a percussively drilled hole by casting with a heavy textile fabric on the hole wall. The pull out load on a 30 ton hollow hydraulic jack for 3 separate tests were all greater than 6 KN/cm., the concrete block disintegrating before the resin failed.

The pull out load for conventional polyester cartridges containing calcium carbonate filler ranged from 4 KN to 6 KN/cm. The use of aluminium hydroxide blend in the resin in accordance with the invention had not, therefore, impaired the anchorage and had possibly improved it slightly.

TABLE 2

| Example No. | 1 | 2 | 3 | 4 |
|---|---|---|---|---|
| Composition (% by weight) of Resin Component | | | | |
| Polyester Resin | 31 | 26.2 | 29.2 | 26.2 |
| Chlorinated hydrocarbon wax (Plasticiser) | — | 3.1 | — | 3.1 |
| Amine treated bentonite | 1.2 | 1.6 | 1.2 | 1.6 |
| Aluminium hydroxide (Grace A) | 22.6 | 18.0 | 13.9 | 10.4 |
| Aluminium hydroxide (Grade B) | — | — | — | — |
| Aluminium hydroxide (Grade C) | 45.2 | 51.1 | 55.7 | 58.7 |
| Aluminium hydroxide (Grade D) | — | — | — | — |
| Calcium carbonate | — | — | — | — |
| Viscosity by Brookfield Viscometer | | | | |
| at 20° C. (cps) | 260,000 | 420,000 | 680,000 | 410,000 |
| At 0.5 rpm | 162,000 | 80,000 | 194,000 | 61,600 |
| At higher shear | (20 RPM) | (20 RPM) | (20 RPM) | (20 RPM) |
| Fire Tests | | | | |
| Extinction time (seconds) for | | | | |
| Uncured resin | 6.75 | 1.0 | 5.5 | 2.5 |
| Cured resin | | | | |
| - 1st exposure | 3.5 | 1.0 | 2.0 | 3.0 |
| - 2nd exposure | 5 | 1.75 | 3.5 | 2.25 |
| Cartridge | | | | |
| On cartridge | 2 | 1.0 | 0.25 | 4.25 |
| On debris | 24.75 | 5.25 | 0 | 6.75 |

| Example No. | 5 | 6 | 7 | 8 |
|---|---|---|---|---|
| Composition (% by weight of Resin Component | | | | |
| Polyester Resin | 31 | 29.2 | 34.5 | 41.5 |
| Chlorinated hydrocarbon wax (Plasticiser) | — | — | 4.0 | 4.9 |
| Amine treated bentonite | 1.2 | 1.2 | 2.0 | 2.5 |
| Aluminum hydroxide (Grade A) | 7.5 | 13.9 | 17.8 | 51.1 |
| Aluminium hydroxide (Grade B) | — | — | 41.7 | — |
| Aluminium hydroxide (Grade C) | 60.3 | — | — | — |
| Aluminium hydroxide (Grade D) | — | 55.7 | — | — |
| Calcium carbonate | — | — | — | — |
| Viscosity by Brookfield Viscometer | | | | |
| at 20° C. (cps) | 1,200,000 | 540,000 | 3,400,000 | 60,000 |
| At 0.5 rpm | 144,000 | 138,000 | 800,000 | 536,000 |
| At higher shear | (20 RPM) | (20 RPM) | (5 RPM) | (5 RPM) |
| Fire Tests | | | | |
| Extinction time (seconds) for | | | | |
| Uncured resin | 16.0 | 12.25 | 18.5 | 39.3 |
| Cured resin | | | | |
| - 1st exposure | 4.25 | 4.0 | 5.75 | 3.75 |
| - 2nd exposure | 4.5 | 6.3 | 21.25 | 5.5 |
| Cartridge - | | | | |
| On cartridge | 10.5 | 23.0 | 4.75 | 23 |
| On debris | 28.5 | 33.5 | 36.25 | 75 |

| Example No. | 9 | 10 | 11 |
|---|---|---|---|
| Composition (% by weight) of Resin Component | | | |
| Polyester resin | 31.3 | 28.0 | 24.8 |
| Chlorinated hydrocarbon wax (plasticiser) | 3.7 | 3.2 | 2.9 |
| Amine treated bentonite | 1.8 | 1.6 | 1.5 |
| Aluminium hydroxide (Grade A) | — | — | — |
| Aluminium hydroxide (Grade B) | 63.2 | — | — |
| Aluminium hydroxide (Grade C) | — | 67.2 | — |
| Aluminium hydroxide (Grade D) | — | — | — |
| Calcium carbonate | — | — | 70.8 |
| Viscosity by Brookfield Viscometer | | | |
| at 20° C. (cps) | 1,780,000 | 550,000 | 650,000 |
| At 0.5 rpm | 394,000 | 132,000 | 68,000 |
| At higher shear | (10 RPM) | (20 RPM) | (20 RPM) |
| Fire Tests | | | |
| Extinction time (seconds) for | | | |
| Uncured resin | 52.5 | 167 | >300 |
| Cured resin | | | |
| - 1st exposure | 4.0 | 16.75 | >150 |
| - 2nd exposure | 4.25 | 10.5 | |
| Cartridge - | | | |
| On cartridge | 31.7 | 4.7 | >300 |
| On debris | 72.7 | 103.4 | >300 |

EXAMPLES 12 to 15

Hardener component for hardening resin compositions having the compositions given in Table 3 were prepared and tested for fire resistance by the method described above.

The aluminium hydroxide grades were Grades A and C described above.

The benzoyl peroxide was used in the form of a paste containing 60% benzoyl peroxide and 40% of plasticiser comprising chlorinated hydrocarbon wax and dibutyl phthalate.

The results show that Example 12, containing a blend of aluminium hydroxide Grades A and C, was more fire resistant than Examples 13 and 14 and was very much better than Example 15 which did not contain any aluminium hydroxide.

Samples of the resin component of Example 2 were cartridged as to component resin cartridges using, as hardener, 12 parts of the hardener composition of Example 12 per 100 parts of resin component. When tested to anchor a ribbed steel bolt as previously described the pull out load was greater than 6 KN/cm, showing that the aluminium hydroxide blend did not impair the hardening effect of the hardener component.

TABLE 3

| Example No. | 12 | 13 | 14 | 15 |
|---|---|---|---|---|
| Composition (Parts) | | | | |
| 60/40 Benzoyl peroxide/plasticiser (parts by weight) | 17 | 17 | 17 | 17 |
| Chlorinated hydrocarbon wax | 33 | 33 | 33 | 33 |
| Aluminium hydroxide - Grade A | 25 | 40 | | |
| Aluminium hydroxide - Grade C | 50 | | 75 | |
| China Clay | | | | 25 |
| Calcium carbonate | | | | 25 |
| Fire Test | | | | |
| Extinction time (seconds) | — | 4 | 50.5 | 5.5 Continued to burn |

We claim:

1. Hardenable resin compositions containing unsaturated polyester resin hardenable by means of a peroxide catalyst, crosslinking monomer and containing, as an additive to enhance their fire resistance, particulate aluminium hydroxide wherein 12 to 33% by weight of the particles have a diameter less than 1 micron, 45 to 75% by weight of the particles have a diameter in the range from 38 to 150 microns and less than 20% by weight of the particles have a diameter in the range from 1 to 38 microns.

2. Compositions according to claim 1 wherein the aluminium hydroxide is in the form of a blend of a coarse grade and a fine grade of particulate aluminium hydroxide; said coarse grade having an average particle diameter of 50 to 100 microns and containing less than 10% by weight of particles having a diameter less than 5 microns and at least 90% by weight of particles having a diameter less than 150 microns; said fine grade having average particle diameter of 0.4 to 0.8 microns and containing at least 80% by weight of particles having a diameter of less than 1 micron; and the ratio of coarse grade to fine grade in the said blend being in the range 2:1 to 5.6:1.

3. A composition as claimed in claim 1 wherein the polyester resin comprises a condensation product of propylene glycol and a compound selected from the group consisting of maleic anhydride and phthalic anhydride.

4. A composition as claimed in claim 3 wherein the crosslinking monomer comprises styrene or vinyl toluene.

5. A composition as claimed in claim 1 comprising an aromatic amine as promoter.

6. A composition as claimed in claim 1 comprising filler selected from the group consisting of calcium carbonate, quartz, china clay, bentonite, chalk, titanium dioxide and mixtures thereof.

7. A composition as claimed in claim 1 characterised in that the amount of aluminium hydroxide is in the range from 40 to 80% by weight of the composition.

8. A method of improving the fire resistance of hardenable resin compositions containing cross-linking monomer and unsaturated polyester resin hardenable by means of a peroxide catalyst and of improving the fire resistance of components of such resin compositions in which method there is mixed with the said resin composition or component particulate aluminium hydroxide wherein 12 to 33% by weight of the particles have a diameter less than 1 micron, 45 to 75% by weight of the particles have a diameter in the range from 38 to 150 microns and less than 20% by weight of the particles have a diameter in the range from 1 to 38 microns.

9. A method according to claim 8 wherein the aluminium hydroxide is in the form of a blend of a coarse grade and a fine grade; said coarse grade having an average particle diameter of 50 to 100 microns and containing less than 10% by weight of particles having a diameter less than 5 microns and at least 90% by weight of particles having a diameter less than 150 microns; said fine grade having average particle diameter of 0.4 to 0.8 microns and containing at least 80% by weight of particles having a diameter of less than 1 micron; and the ratio of coarse grade to fine grade in the blend being in the range 2:1 to 5.6:1.

10. A blend of particulate aluminium hydroxide effective to improve the fire resistance of hardenable resins and hardener components for resin compositions, the blend consisting of a coarse grade and a fine grade of particulate aluminium hydroxide; said coarse grade having an average particle diameter of 50 to 100 microns and containing less than 10% by weight of particles having a diameter of less than 5 microns and at least 90% by weight of particles having a diameter of less than 150 microns; said fine grade having average particle diameter of 0.4 to 1.8 microns and containing at least 80% by weight of particles having a diameter of less than 1 micron; and the ratio of coarse grade to fine grade in the blend being in the range 2:1 to 5.6:1.

11. A hardener component for hardening a polyester resin composition, the component containing a peroxide catalyst for hardening the resin composition, a liquid dispersant for the catalyst and, as an additive to enhance fire resistance, particulate aluminium hydroxide wherein 12 to 33% by weight of the particles have a diameter less than 1 micron, 45 to 75% by weight of the particles have a diameter in the range from 38 to 150 microns and less than 20% by weight of the particles have a diameter in the range from 1 to 38 microns.

12. A hardener component as in claim 11 wherein the aluminium hydroxide is in the form of a blend of a coarse grade and a fine grade of particulate aluminium hydroxide; said coarse grade having an average particle diameter of 50 to 100 microns and containing less than 10% by weight of particles having a diameter less than 5 microns and at least 90% by weight of particles having a diameter less than 150 microns; said fine grade having average particle diameter of 0.4 to 0.8 microns and containing at least 80% by weight of particles having a diameter of less than 1 micron; and the ratio of coarse grade to fine grade in the said blend being in the range 2:1 to 5.6:1.

13. A hardener component as in claim 11 wherein the active hardener comprises benzoyl peroxide.

14. A hardener component as in claim 13 wherein the benzoyl peroxide is dispersed in a paste with dispersant, said paste also containing inorganic filler and said aluminium hydroxide.

15. A hardener component as in claim 11 wherein the amount of aluminium hydroxide is in the range from 40 to 80% by weight.

* * * * *